United States Patent
Joos et al.

(10) Patent No.: US 9,309,852 B2
(45) Date of Patent: Apr. 12, 2016

(54) METHOD FOR ACTIVATING AN INJECTOR IN A FUEL INJECTION SYSTEM IN AN INTERNAL COMBUSTION ENGINE

(75) Inventors: Klaus Joos, Walheim (DE); Werner Hess, Stuttgart (DE); Ruben Schlueter, Yokohoma (JP); Holger Rapp, Ditzingen (DE); Haris Hamedovic, Moeglingen (DE); Harry Friedmann, Vaihingen An Der Enz (DE); Andreas Koch, Loechgau (DE); Christian Reschke, Leonberg (DE); Joerg Koenig, Stuttgart (DE); Stephanie Wirth, Renningen (DE); Achim Hirchenhein, Trierweiler (DE)

(73) Assignee: ROBERT BOSCH GMBH, Stuttgart (DE)

( * ) Notice: Subject to any disclaimer, the term of this patent is extended or adjusted under 35 U.S.C. 154(b) by 349 days.

(21) Appl. No.: 13/980,098

(22) PCT Filed: Dec. 2, 2011

(86) PCT No.: PCT/EP2011/071609
§ 371 (c)(1),
(2), (4) Date: Sep. 25, 2013

(87) PCT Pub. No.: WO2012/097907
PCT Pub. Date: Jul. 26, 2012

(65) Prior Publication Data
US 2014/0007847 A1    Jan. 9, 2014

(30) Foreign Application Priority Data
Jan. 17, 2011 (DE) .......... 10 2011 002 764

(51) Int. Cl.
*F02D 41/30* (2006.01)
*F02M 69/00* (2006.01)
(Continued)

(52) U.S. Cl.
CPC ............. *F02M 69/00* (2013.01); *F02D 41/247* (2013.01); *F02D 41/2432* (2013.01); *F02D 41/40* (2013.01); *Y02T 10/44* (2013.01)

(58) Field of Classification Search
CPC .. F02M 69/00; F02D 41/2432; F02D 41/247; F02D 41/40; F02D 41/3836; F02D 2200/0602; F02D 2200/0606
USPC ........................ 123/457, 464, 472, 490, 511; 73/114.43, 114.48, 114.49, 114.51
See application file for complete search history.

(56) References Cited

U.S. PATENT DOCUMENTS 4,788,960 A    12/1988  Oshizawa
5,448,977 A *  9/1995  Smith et al. .................... 123/478
(Continued)

FOREIGN PATENT DOCUMENTS

DE           38 11 436       10/1988
DE     10 2007 060 638       6/2009
(Continued)

OTHER PUBLICATIONS

International Search Report, PCT International Application No. PCT/EP2011/071609, dated Mar. 23, 2012.

*Primary Examiner* — Hai Huynh
(74) *Attorney, Agent, or Firm* — Kenyon & Kenyon LLP

(57) ABSTRACT

A method for activating an injector in a fuel injection system in an internal combustion engine, the fuel injection system including a plurality of injectors and a quantity of fuel injected with the aid of an injector being a function of the activation period of the injector. An injector-individual correction value for the activation period is ascertained for at least one injector as a function of a pressure and a temperature of the fuel to be injected and the activation for this injector takes place under consideration of the injector-individual correction value.

9 Claims, 4 Drawing Sheets

(51) Int. Cl.
  *F02D 41/24*   (2006.01)
  *F02D 41/40*   (2006.01)

(56) References Cited

U.S. PATENT DOCUMENTS

|  |  |  |  |  |
|---|---|---|---|---|
| 5,865,158 | A * | 2/1999 | Cleveland et al. | 123/478 |
| 7,093,586 | B2 * | 8/2006 | Mattes | 123/478 |
| 7,152,575 | B2 * | 12/2006 | Fritsch et al. | 123/299 |
| 7,628,146 | B2 * | 12/2009 | Kloppenburg et al. | 123/673 |
| 8,374,770 | B2 * | 2/2013 | Jung et al. | 701/104 |
| 2007/0251507 | A1 * | 11/2007 | Mueller et al. | 123/493 |

FOREIGN PATENT DOCUMENTS

| DE | 10 2009 003 211 | 11/2010 |
|---|---|---|
| DE | 10 2009 003 212 | 11/2010 |
| GB | 2 284 908 | 6/1995 |
| JP | 62-32251 | 2/1987 |
| JP | 62-186034 | 8/1987 |
| JP | 7-197840 | 8/1995 |
| JP | 8-14078 | 1/1996 |
| JP | 8-210168 | 8/1996 |
| JP | 8-210209 | 8/1996 |
| JP | 2000-18068 | 1/2000 |
| JP | 2001-98991 | 4/2001 |
| JP | 2003-254139 | 9/2003 |
| JP | 2003-314355 | 11/2003 |
| JP | 2007-132315 | 5/2007 |
| JP | 2009-57909 | 3/2009 |
| JP | 2009-57928 | 3/2009 |
| JP | 2009-235956 | 10/2009 |
| JP | 2010-180824 | 8/2010 |
| WO | WO 2004/090315 | 10/2004 |

* cited by examiner

METHOD FOR ACTIVATING AN INJECTOR IN A FUEL INJECTION SYSTEM IN AN INTERNAL COMBUSTION ENGINE

FIELD

The present invention relates to a method for activating an injector in a fuel injection system in an internal combustion engine.

BACKGROUND INFORMATION

Fuel injection systems make it possible to meter the fuel needed for combustion in an internal combustion engine with the aid of one or multiple injectors. In the case of direct gasoline injection and common rail injection, the fuel is injected directly into the combustion chamber. For the combustion quality, and accordingly the fuel consumption and exhaust emissions of the internal combustion engine, the metered quantity of fuel is of crucial importance.

The metered quantity of fuel is, however, influenced by properties of the injector per se. Due to manufacturing tolerances, which occur in the injectors used within an internal combustion engine, the quantity of fuel metered by these injectors tends to vary, resulting in a reduced combustion quality. In particular in the so-called small quantity range (partial lift range, ballistic range), the impact of a relative manufacturing tolerance of the injectors is particularly severe. For addressing this problem, injector calibration methods are used in which a relationship between activation period (ti) and injection quantity (q) is established injector-individually in order to be able to use this relationship for future injections.

Various injector calibration methods are described in German Patent Application Nos. DE 10 2009 003 212 A1 and DE 10 2009 003 211 A1. These methods are, however, highly complex in terms of regulation technology, so that measured variables for the regulation are ascertained for each activation operation.

It is desirable to simplify the injector calibration.

SUMMARY

In accordance with the present invention, an example method for activating an injector in a fuel injection system in an internal combustion engine is described. Advantageous embodiments are described below.

In accordance with the present invention, an injector calibration, in particular for the ballistic range at a nearly constant quality, but with a greatly reduced computing complexity, may be carried out if, instead of a complex regulation, only a pressure- and temperature-dependent, injector-individual correction value is used for the activation period. A complex regulation of the injection period is not necessary. Differences between individual valves or effects of valve aging are adapted by a simple method and may be included directly in the pilot control of the activation period as a correction value, in particular when a regulation of the injection period is impossible. The present invention covers effects of aging and manufacturing tolerances of the injectors even without regulation by using a pressure- and temperature-dependent parameter. This parameter is directly included in the pilot control of the injector and is always available, for example, at the start, in the case of non-readiness for closed loop control, etc.

In a preferred embodiment, a number of injector-individual correction values are stored in a characteristics map. For the correction of the activation period, the injector-individual correction value resulting from the characteristics map is then simply considered. The computing complexity may be reduced since, in particular, the necessity for ascertaining correction values from measured values in real time, so to speak, is eliminated. It is instead sufficient to determine the correction values in advance (usually at any predefined or regular points in time during the entire period of operation), i.e., before they are actually included in the activation, and then only to read them from the characteristics map.

In the context of the present invention, the period over which a competent control unit applies current to the injector, i.e., activates it, is denoted as activation period (ti). The period during which the injector is at least partially open, and therefore fuel is injected, is denoted as injection period (t_open). Due to mechanical, hydraulic and electrical delays, the opening operation of the injector starts a first delay period after the start of activation, and the closing operation in turn terminates a certain second delay period (also referred to as a closing delay period) after the end of the activation period.

A particularly accurate correction may be achieved if the injector-individual correction value is ascertained based on a deviation between an actual injection period and a setpoint injection period of this injector.

A simple possibility for ascertaining an injector-individual correction value for at least one operating point, which is characterized by at least the pressure and temperature of the fuel to be injected, is to vary a setpoint injection quantity and accordingly the setpoint injection period at a fixed pressure and a fixed temperature of the fuel to be injected, and to ascertain the injector-individual correction value as a function of the actual injection period on the setpoint injection period.

According to a preferred specific example embodiment, a first activation period is determined for a setpoint injection quantity, for example, in a conventional manner, and used for the activation. Subsequently, the resultant actual injection period is ascertained (for example, based on a model or by measurement) and compared with the setpoint injection period. If the actual injection period is too long, the activation period is reduced; if the actual injection period is too short, the activation period is increased. If the setpoint injection period is achieved, it is possible to determine the injector-individual correction value from the difference between the old and the new activation period. This type of ascertainment is particularly simple to implement and nonetheless delivers good results. An interpolation or extrapolation may be carried out for improvement in order to determine the relationship between activation period and injection period more accurately.

Likewise, the injector-individual correction value is advantageously determined as an integrator value of a regulation, at which the actual injection period is regulated to the setpoint injection period. After the injector-individual correction value is ascertained from the integrator value, the integrator is reset.

An arithmetic unit according to the present invention, for example, a control unit of a motor vehicle, is, in particular, programmed for implementing an example method according to the present invention.

The implementation of the example method in the form of software is also advantageous, since it entails very low costs, in particular when an executing control unit is also used for other tasks and is therefore present anyway. Suitable data media for providing the computer program are, in particular, diskettes, hard drives, flash memories, EEPROMs, CD-ROMs, DVDs, etc. A download of a program via computer networks (Internet, intranet, etc.) is also possible.

Additional advantages and embodiments of the present invention described herein and are shown in the figures.

It is understood that the features described above and the features explained below are usable not only in the particular combination specified but also in other combinations or alone without departing from the scope of the present invention.

The present invention is depicted schematically in the figures based on an exemplary embodiment and are described in detail below with reference to the figures.

DETAILED DESCRIPTION OF EXAMPLE EMBODIMENTS

Figure 1:
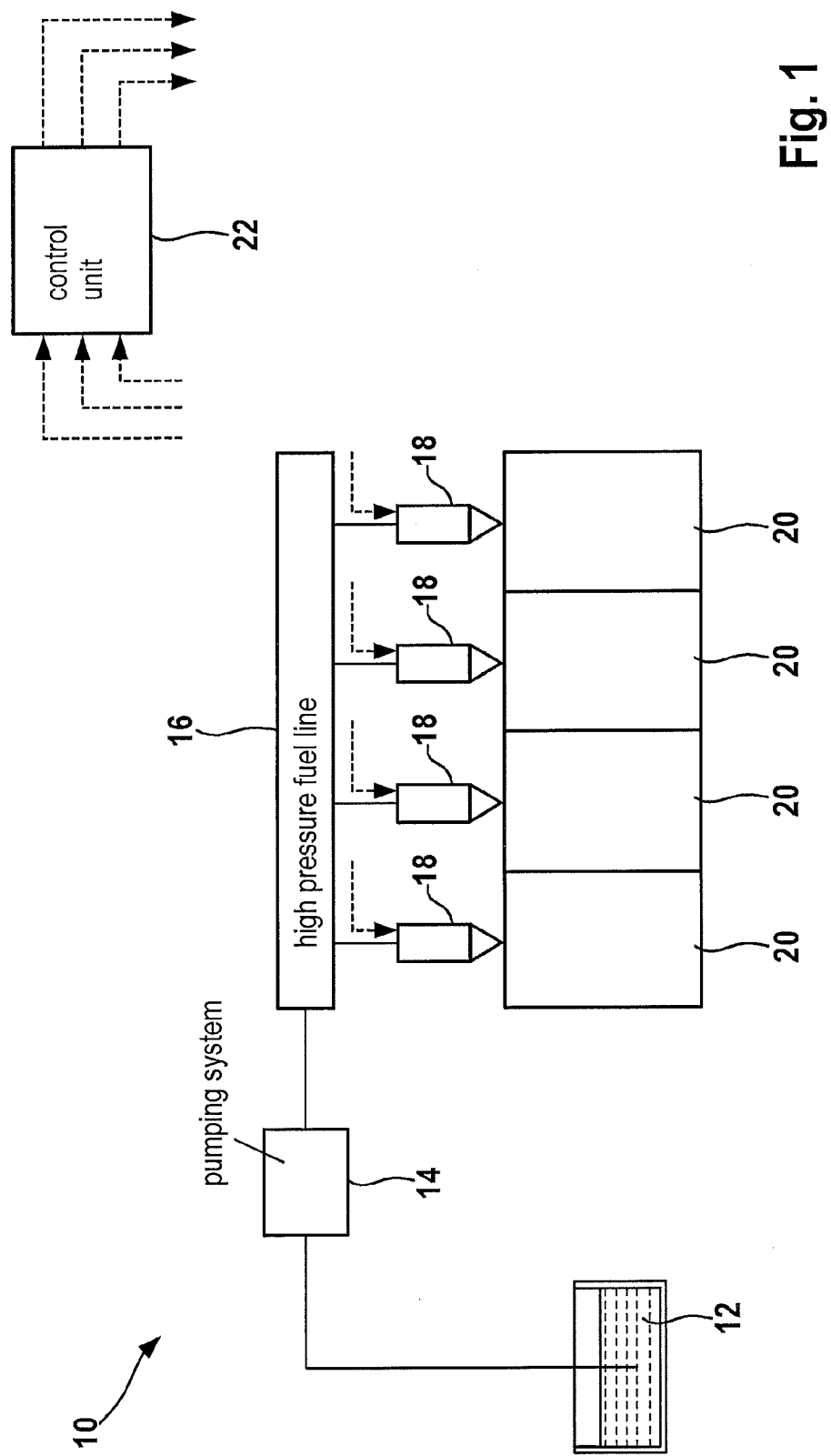
FIG. 1 shows a representation of an internal combustion engine in a highly schematic form, having a fuel injection system and a plurality of injectors.

FIG. 1 shows an internal combustion engine 10, which includes a fuel tank 12, from which fuel is pumped into a high-pressure fuel line 16 with the aid of a pumping system 14. High-pressure fuel line 16 is, for example, designed as a common rail. High-pressure fuel line 16 is connected to injectors 18, which make it possible for fuel to be injected directly into combustion chambers 20, which are each assigned to injectors 18. The operation of internal combustion engine 10 and in particular the fuel injection system, which in this case includes pumping system 14, high-pressure line 16 and injectors 18, is controlled by an arithmetic unit, in this case a control unit 22. Control unit 22 enables the detection of input values and the provision of output values, or the activation of actuators, in particular the activation of injectors 18.

Figure 2A:
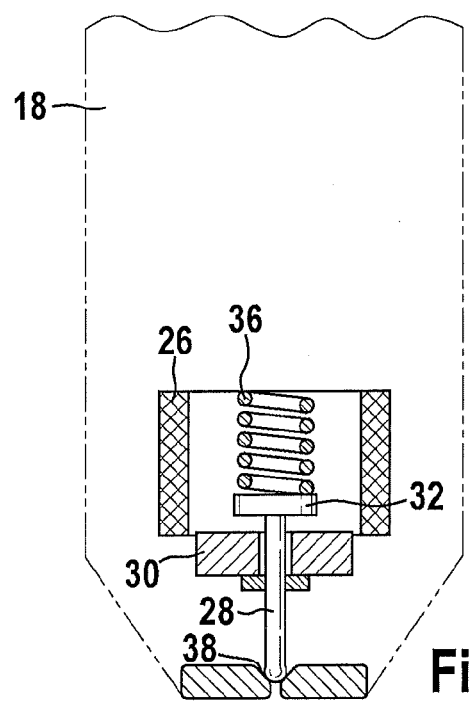
FIG. 2a shows a detailed schematic view of an exemplary specific embodiment of an injector in a closed operating state.
Figure 2B:
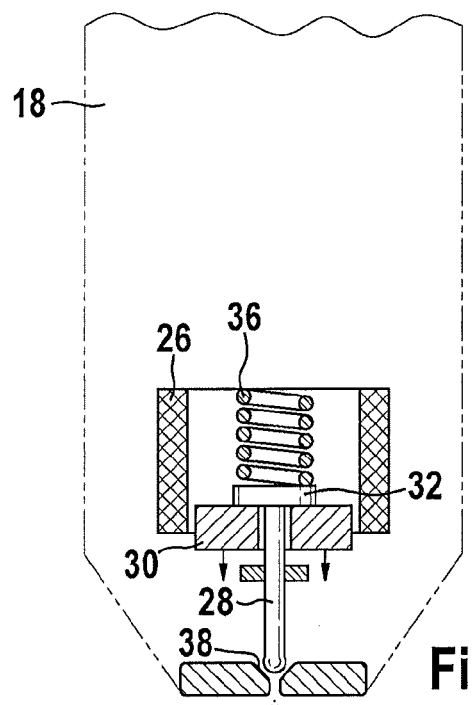
FIG. 2b shows a detailed schematic view of an exemplary specific embodiment of an injector in an open operating state.

In FIG. 2a, an enlarged view of injector 18 as shown in FIG. 1 is shown in the closed state; in FIG. 2b, it is represented schematically in the open state. Injector 18 includes an electromagnetic actuator having a solenoid 26 and an armature 30 cooperating with solenoid 26. Armature 30 is connected to a valve needle 28 in such a way that it is movable in relation to a vertical direction of movement of valve needle 28 in FIG. 2. A valve spring 36 exerts a spring force on valve needle 28 so that it is held in a valve seat 38.

An activation of injector 18 by control unit 22 causes a current to be supplied to solenoid 26, as a result of which armature 30 is moved upwards, so that under engagement with a stop 32, it moves valve needle 28 out of its valve seat 38 against the spring force. This situation is shown in FIG. 2b. At that location, fuel 42 may now be injected from injector 18 into combustion chamber 20.

Figure 3:
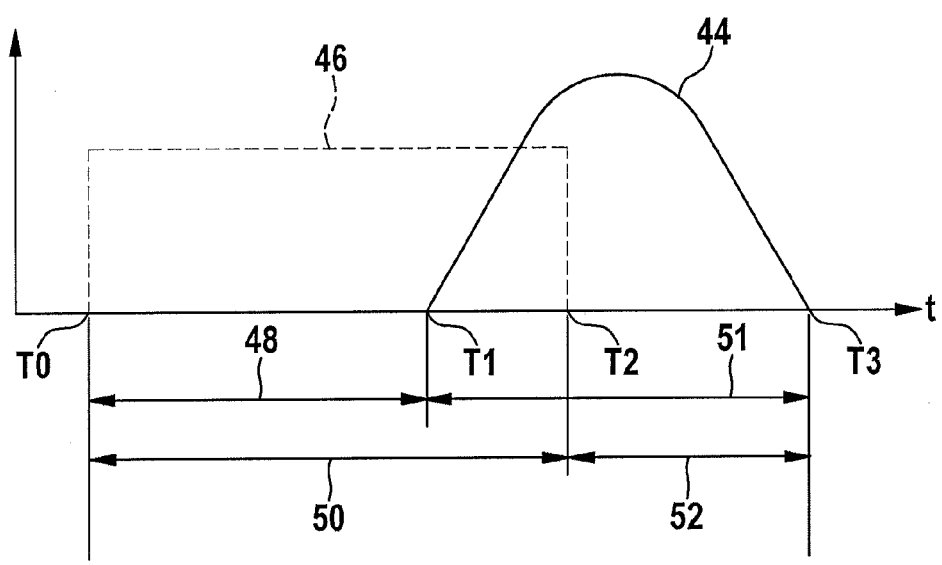
FIG. 3 shows a representation of the clock and needle lift curve of an injector in a schematic form in partial lift mode.

FIG. 3 shows an example of a simplified clock curve 46 and needle lift curve 44 of an injector 18 in partial lift mode. At a point in time T0, injector 18 is activated by control unit 22 with the aid of so-called clock signal 46. After a temporal delay denoted as lift-off delay 48, injector 18 is not opened until point in time T1. At a point in time T2, the activation of injector 18 with the aid of clock signal 46 is ended and injector 18 is closed again at a point in time T3. The period of time between points in time T0 and T2 is denoted as activation period 50, the period of time between points in time T1 and T3 as injection period 51, and the period of time between points in time T2 and T3 as closing period 52.

Control unit 22 is programmed for carrying out a method according to the present invention, as will be explained below with reference to FIG. 4 as an example.

Figure 4:
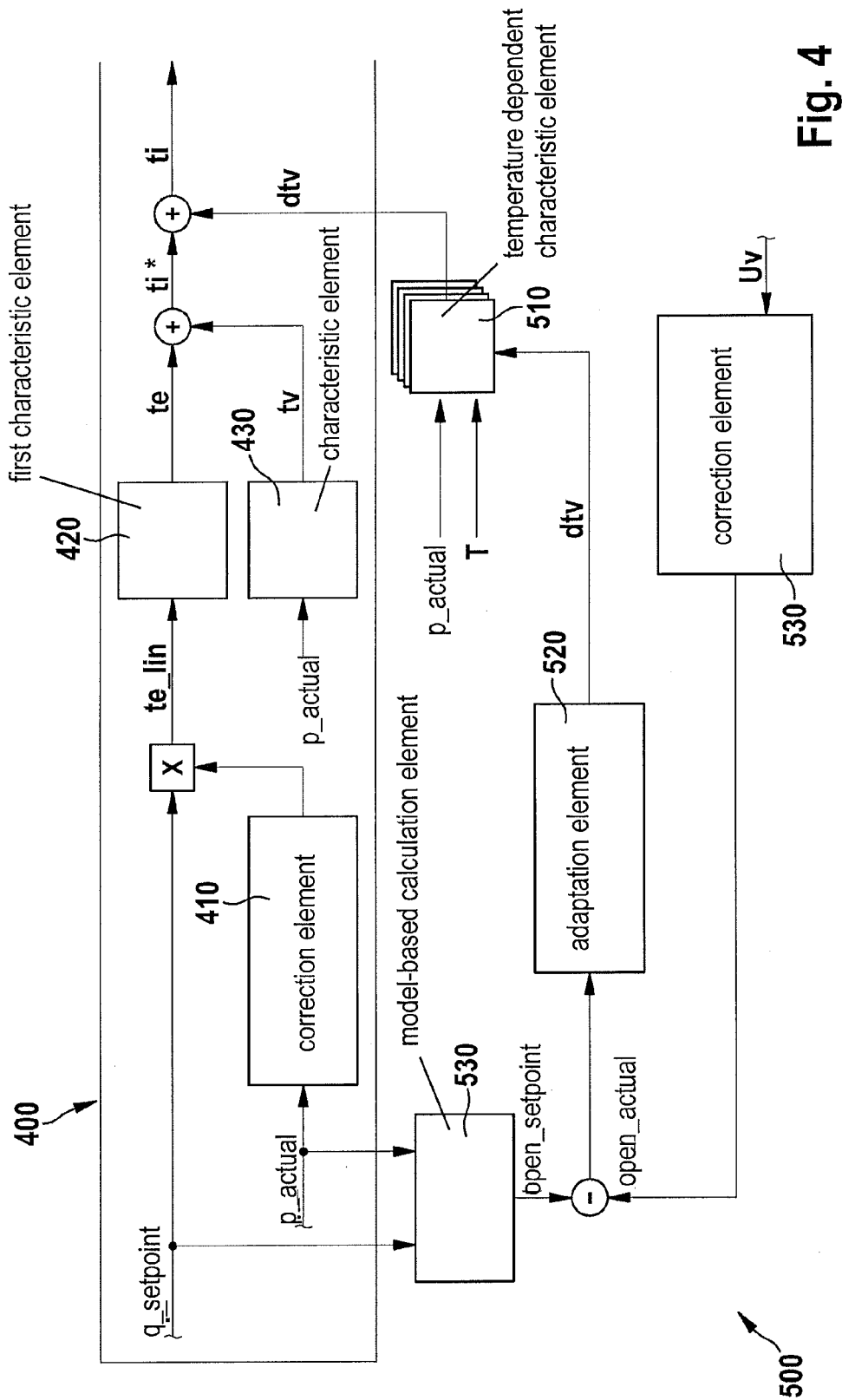
FIG. 4 shows an activation diagram for an injector according to one preferred specific embodiment of the present invention.

FIG. 4 shows an activation diagram of a preferred specific embodiment of the present invention, in which, based on a setpoint injection quantity q_setpoint and an actual pressure p_actual of the fuel to be injected, for example, in common rail 16, an activation period ti is determined (see 50 of FIG. 3). The activation diagram is divided into a conventional pilot control section 400, which is shown in the top half of FIG. 4, and an additional correction section 500, which is shown in the bottom half of FIG. 4.

In the following, the function of pilot control section 400 is explained. From setpoint injection quantity q_setpoint and actual pressure p_actual, a normalized value te_lin is determined for the injection period, actual pressure p_actual being included via a correction element 410, which in particular carries out a so-called Bernoulli correction. In correction element 410, a correction factor for the injection quantity is determined based on a reference injection quantity, a reference pressure and the actual pressure.

Normalized value te_lin is supplied to a first characteristic element 420, which determines an activation period te. A first correction value tv is supplied additively to activation period te to determine actual activation period ti*. First correction value tv is obtained from another characteristic element 430 as a function of actual pressure p_actual.

The pilot control just described is corrected injector-individually in connection with the present invention by correction element 500. For this purpose, an injector-individual correction value dtv is also supplied additively to determine activation time ti. Injector-individual correction value dtv results from a pressure and temperature-dependent characteristic element 510, to which is supplied actual pressure p_actual and temperature T of the fuel to be injected. The temperature may be measured, for example. Advantageously, it may also be possible to model a temperature for the fuel in the injector. Characteristic element 510 is used in particular for simplifying the computing complexity, since only the particular injector-individual correction value dtv for the given operating point (pressure and temperature) must be read out for determining activation period ti.

The filling of characteristic element 510 is—advantageously controlled by a coordinator (stored as a program component in the control unit)—via an adaptation element 520, a preferred possibility for implementation to be described in detail in the following. The objective of the coordinator is to monitor the switch-on conditions for the adaptation, to trigger the calibration and to release correction values.

Starting from setpoint injection quantity q_setpoint and actual pressure p_actual, a characteristic element 530, which has been filled, for example, empirically, determines a setpoint injection period t_open_setpoint. Simultaneously, actual injection period t_open_actual is determined based on a model-based calculation element 530, to which is supplied, for example, voltage Uv which is present on the injector. Alternatively, the actual injection period may also be measured.

The difference between the setpoint injection period and the actual injection period is supplied to adaptation element 520.

According to a preferred specific embodiment of the present invention, the adaptation element determines a dependence of the actual injection period on the setpoint injection period for a fixed operating point. From this dependence, it is then possible to determine corresponding correction value dtv for the operating point (p_actual/T).

If the difference between setpoint injection period t_open_setpoint and actual injection period t_open_actual is initially greater than zero, i.e., t_open_setpoint>t_open_actual, the activation period is increased in a preferred embodiment by a predefinable value Δ. This is repeated stepwise until finally actual injection period t_open_actual is greater than or equal to setpoint injection period t_open_setpoint. In a first embodiment, associated injector-individual correction value dtv is determined from the difference between the instantaneous and initial activation period for dtv=ti−ti*.

In another embodiment, an extrapolation or interpolation may be carried out for improving the result. For this purpose, the pair of values ti (t_open_actual) resulting at the end from the actual injection period and activation period are buffered. From the buffering are then derived the two pairs of values ti_1 (t_open_actual_1) and ti_2 (t_open_actual_2), which lie closest to setpoint injection period t_open_setpoint (in the same or in different directions), in order to determine ti (t_open_setpoint) from them by extrapolation, or preferably interpolation. In this case also, associated injector-individual correction value dtv is determined again from the difference dtv=ti−ti*.

If the difference between setpoint injection period t_open_setpoint and actual injection period t_open_actual is initially less than zero, i.e., t_open_setpoint<t_open_actual, the activation period is decreased in a preferred embodiment by the value Δ, and the method is continued accordingly.

What is claimed is:

1. A method for activating an injector in a fuel injection system in an internal combustion engine, the fuel injection system including a plurality of injectors, and a quantity of fuel injected with the aid of an injector being a function of an activation period of the injector, the method comprising:
ascertaining an injector-individual correction value for the activation period for the injector as a function of a pressure and a temperature of fuel to be injected; and
activating the injector in a partial lift mode under consideration of the injector-individual correction value;
wherein the injector-individual correction value is ascertained based on a deviation between an actual injection period and a setpoint injection period of the injector, and wherein at a fixed pressure and a fixed temperature of the fuel to be injected, a setpoint injection quantity is varied in order to vary the setpoint injection period and to ascertain the injector-individual correction value from a dependence of the actual injection period on the setpoint injection period.

2. The method as recited in claim 1, wherein the injector-individual correction value is included in a pilot control of the activation period via a pressure-dependent and temperature-dependent characteristics map.

3. The method as recited in claim 1, wherein the setpoint injection period is ascertained with the aid of a characteristics map which is dependent on a setpoint injection quantity and pressure of the fuel to be injected.

4. The method as recited in claim 1, wherein the actual injection period is determined one of by measurement or based on a model.

5. The method as recited in claim 1, wherein the activation period is increased when the actual injection period is longer than the setpoint injection period, and the injector-individual correction value is ascertained from a change of the activation period.

6. The method as recited in claim 1, wherein the activation period is reduced when the actual injection period is shorter than the setpoint injection period, and the injector-individual correction value is ascertained from a change of the activation period.

7. The method as recited in claim 1, wherein the ascertaining of the injector-individual correction value is controlled by a coordinator, which at least one of monitors a switch-on condition for an injector calibration operation, triggers an injector calibration operation, and releases the injector-individual correction value.

8. The method as recited in claim 1, wherein the injector-individual correction value is determined during the operation at least one of: i) at predetermined points in time, ii) regularly, and iii) if predetermined conditions occur.

9. An arithmetic unit designed to activate an injector in a fuel injection system in an internal combustion engine, the fuel injection system including a plurality of injectors, and a quantity of fuel injected with the aid of an injection being a function of an activation period of the injector, the arithmetic unit to ascertain an injector-individual correction value for the activation period for the injector as a function of a pressure and a temperature of fuel to be injected, and to activate the injector in a partial lift mode under consideration of the injector-individual correction value, wherein the injector-individual correction value is ascertained based on a deviation between an actual injection period and a setpoint injection period of the injector, and wherein at a fixed pressure and a fixed temperature of the fuel to be injected, a setpoint injection quantity is varied in order to vary the setpoint injection period and to ascertain the injector-individual correction value from a dependence of the actual injection period on the setpoint injection period.

* * * * *